US011912479B1

(12) United States Patent
Stewart

(10) Patent No.: US 11,912,479 B1
(45) Date of Patent: Feb. 27, 2024

(54) HYDRATION CONTAINER

(71) Applicant: Donovan Stewart, Panama City, FL (US)

(72) Inventor: Donovan Stewart, Panama City, FL (US)

( * ) Notice: Subject to any disclaimer, the term of this patent is extended or adjusted under 35 U.S.C. 154(b) by 163 days.

(21) Appl. No.: 17/336,168

(22) Filed: Jun. 1, 2021

(51) Int. Cl.

| | |
|---|---|
| ***B65D 51/28*** | (2006.01) |
| ***B65D 23/00*** | (2006.01) |
| ***B65D 23/10*** | (2006.01) |
| ***B65D 81/32*** | (2006.01) |
| ***G08B 21/18*** | (2006.01) |
| ***B65D 43/02*** | (2006.01) |

(52) U.S. Cl.
CPC ....... *B65D 51/2864* (2013.01); *B65D 23/006* (2013.01); *B65D 23/104* (2013.01); *B65D 43/0231* (2013.01); *B65D 81/3233* (2013.01); *G08B 21/182* (2013.01); *B65D 2203/04* (2013.01); *B65D 2203/12* (2013.01)

(58) Field of Classification Search
CPC .............. B65D 51/2864; B65D 23/006; B65D 23/104; B65D 43/0231; B65D 81/3233; B65D 81/02; B65D 2203/04; B65D 2203/12; G08B 21/18
USPC .......................................................... 340/618
See application file for complete search history.

(56) References Cited

U.S. PATENT DOCUMENTS

| | | | | |
|---|---|---|---|---|
| 10,433,666 | B1 * | 10/2019 | Jovanov | B65D 43/0202 |
| 2009/0205402 | A1 * | 8/2009 | Jackson | G01F 1/007<br>73/304 C |
| 2012/0097566 | A1 * | 4/2012 | Steadman | B65D 25/56<br>206/459.1 |
| 2012/0152781 | A1 * | 6/2012 | Tussy | B65D 1/165<br>206/459.1 |
| 2016/0236819 | A1 * | 8/2016 | Yurkovetskaya | B65D 43/0231 |
| 2016/0286993 | A1 * | 10/2016 | Pau | A47G 19/2288 |
| 2017/0341830 | A1 * | 11/2017 | Nishizawa | G01F 23/2967 |
| 2018/0186528 | A1 * | 7/2018 | Tonn | G01F 11/16 |
| 2018/0186529 | A1 * | 7/2018 | Tonn | B65D 43/16 |
| 2019/0008105 | A1 * | 1/2019 | Bacher | A01G 31/02 |
| 2019/0021527 | A1 * | 1/2019 | Bissen | A47G 19/12 |
| 2019/0021528 | A1 * | 1/2019 | Bissen | G16H 20/60 |
| 2019/0021529 | A1 * | 1/2019 | Schucker | A47G 19/2227 |
| 2019/0117006 | A1 * | 4/2019 | Cerasani | A47J 31/0636 |
| 2021/0048326 | A1 * | 2/2021 | Tonn | G01F 11/006 |

* cited by examiner

*Primary Examiner* — Zhen Y Wu
(74) *Attorney, Agent, or Firm* — Christopher J. Vandam, P.A.; Chris Van Dam

(57) ABSTRACT

A personal container for hydrating liquid. The container has a inner cup containing an adjuvant that is selectively introduced into the liquid in the container. The base contains electronic means to digitally measure the quantity of liquid in the container. The electronic means measures the time relative to the quantity of liquid to ensure a sufficient volume of liquid is consumed at a pre-specified rate.

7 Claims, 3 Drawing Sheets

HYDRATION CONTAINER

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None

STATEMENT REGARDING PRIOR DISCLOSURES BY AN INVENTOR OR JOINT INVENTOR

None.

BACKGROUND OF THE INVENTION

1. Field of the Invention

The present invention relates to portable beverage containers, and more particularly, to an improved hydration container that aids a user in getting timely and appropriate hydration.

2. Description of Related Art Including Information Disclosed Under 37 CFR 1.97 and 37 CFR 1.98

Several designs for beverage containers have been developed in the past. None of them, however, include both a means to measure and monitor the quantity of beverage contained and used with a means to selectively introduce an adjuvant into the liquid.

Applicant believes that the closest reference corresponds to U.S. Pat. No. 9,792,409 issued to Wernow. However, it differs from the present application because the present invention includes a capsule assembly that allows the selective introduction of an adjuvant into the liquid contained in the container assembly. Further, the present invention utilizes adaptive controls and monitoring to ensure that the user of the device consumes an appropriate volume of liquid and on a timely basis.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main objects of the present invention to provide a hydration container that calculates the quantity of hydrating fluid contained therein integrated with a scheduling and notification system to remind the user to hydrate appropriately.

It is another object of this invention to provide a hydration container that selectively introduces a second ingredient into the liquid or allows the user to consume the liquid contained therein without additives.

It is still another object of the present invention to provide a convenient and effective means for a user or third-party to ensure consistent and adequate hydration of the user.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention exists in the details of construction and combination of parts, as will be more fully understood from the following description, when read in conjunction with the accompanying drawings in which.

DETAILED DESCRIPTION OF THE INVENTION

Figure 1:
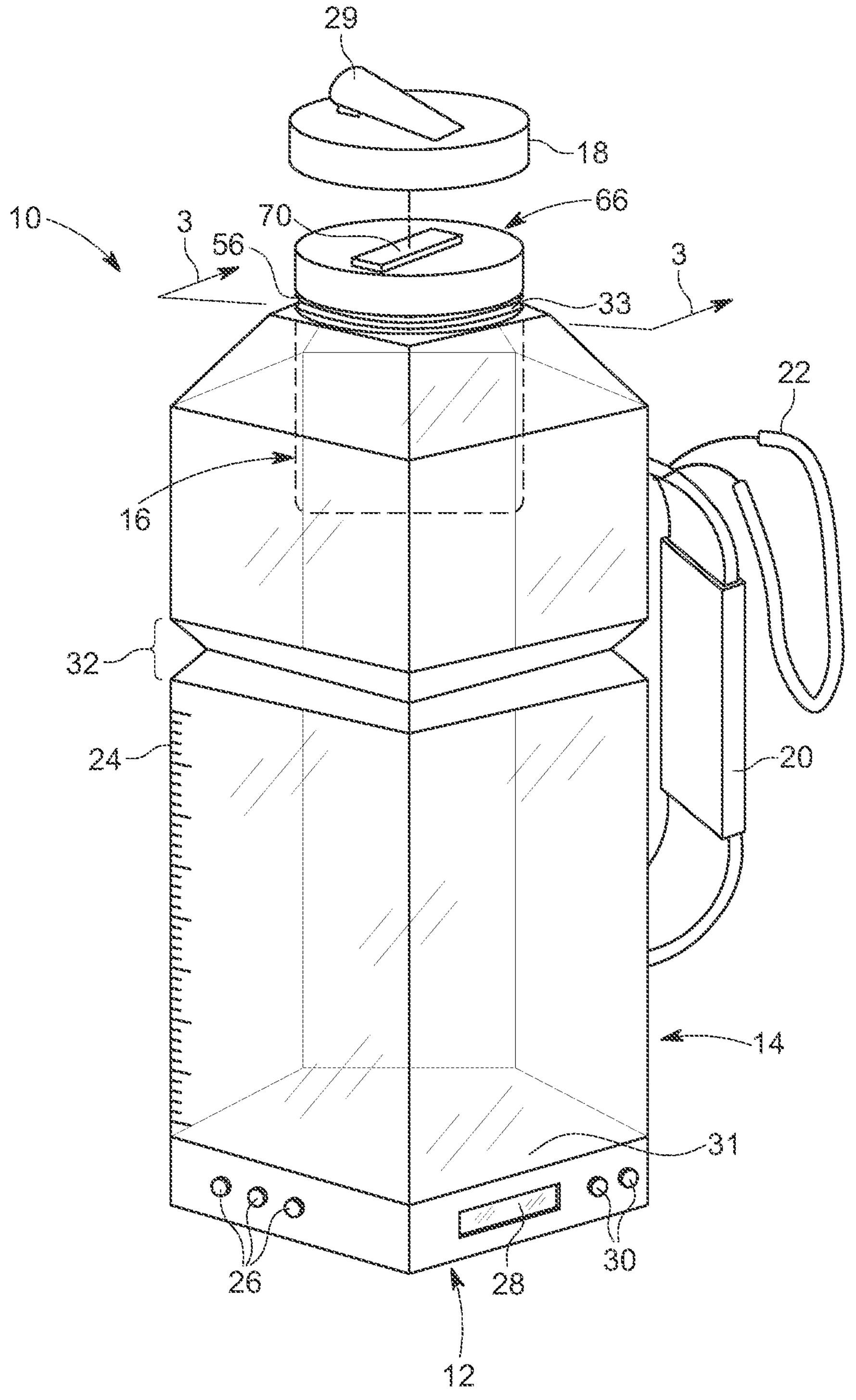
FIG. 1 shows a perspective view of an example of a hydration container.

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like referenced numerals in the figures shall refer to like features unless otherwise indicated or is obvious by context.

The subject device and method of use is sometimes referred to as the device, the invention, the hydration container, the hydration device, the liquid container, the genius gallon, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a base assembly 12, a container assembly 14, a capsule assembly 16, a cap 18, a handle 20, a tether 22, graduations 24, indicators 26, a display 28, a spout cover 29, controls 30, a bottom 31, a waist 32, a neck 33, an inner cup 34, and outer cup 36, a tab 38, a notch 40, apertures 42, a point 44, apertures 46, plugs 48, a rim 50, a rim 52, a rim 54, threads 56, a gasket 58, a notch 60, a tab 62, apertures 64, a lid assembly 66, a disk 68, a lever 70, a diffuser assembly 72, an aperture 73, a rim 74, an interior 75, a dimple 76, a lip 78, a surface 80, a rim 82, a lip 84, apertures 86, a lid 88, a port 90, a battery 92, a scale 94, a processor 96, and antenna 98.

FIG. 1 shows an example of the hydration container that generally comprises a base assembly 12, a container assembly 14, a capsule assembly 16 and a lid assembly 66. The container assembly 14 has an interior volume that contains a primary liquid, such as water. The primary liquid contained in the container assembly 14 could also be any other liquid that the device may dispense. For example, this may include milk, electrolytic water or any other liquid that can consumed alone or combined with an adjuvant for human consumption.

Figure 3:
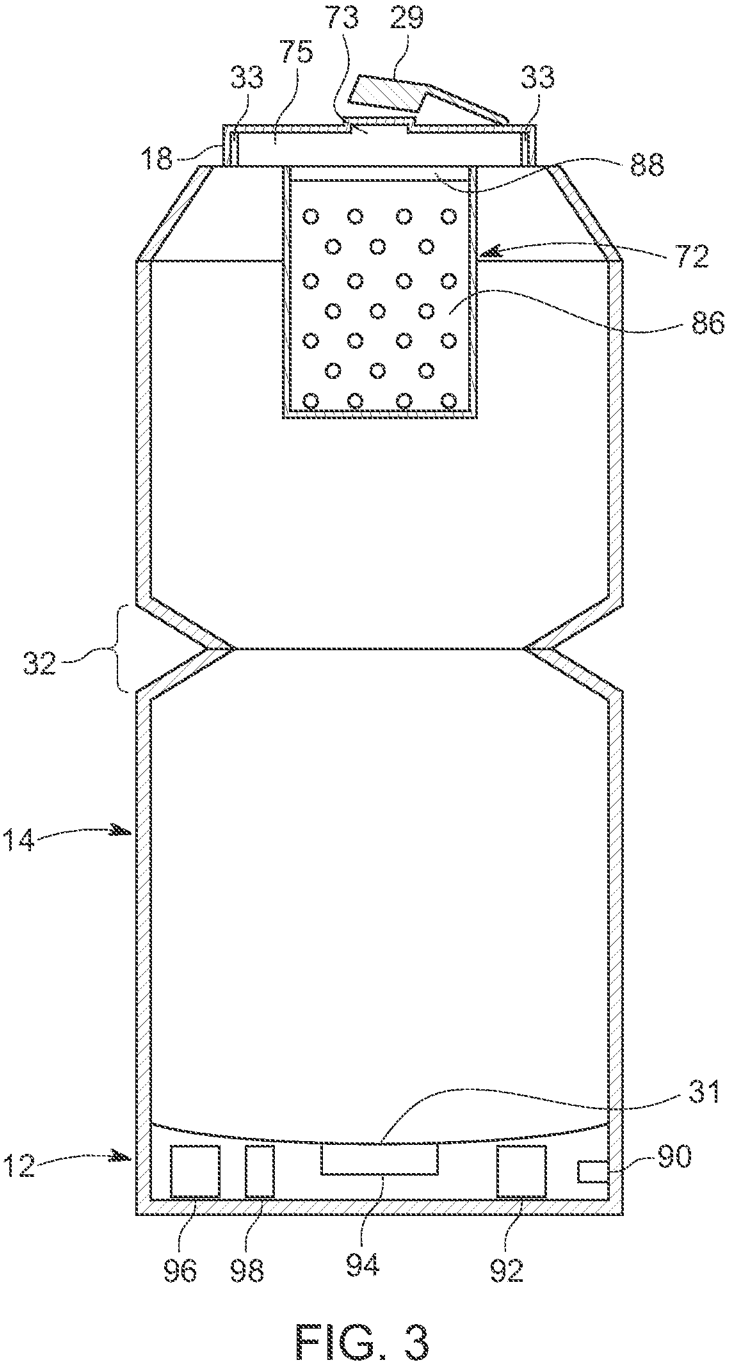
FIG. 3 shows a cross-section elevation view of an alternate version of the hydration container.

The base assembly 12 contains, among other features, the electronic controls that allow the device to measure the quantity of liquid contained and consumed while also being able to communicate essential information to the user or other third-party monitor. An example of the base assembly 12 is shown in FIGS. 1 and 3.

On the exterior of the base assembly 12 are one or more visual indicators 26. These indicators 26 are provided to deliver information to the user about the state of the device and/or provide recommendations to the user. For example, colored indicators may be provided that show a green when the hydration state is adequate, yellow when additional hydration should timely be consumed or red when hydration should be promptly introduced into the user.

Alternatively, the visual indicators 26 may be used to show status conditions of the device. For example, the indicators may reflect when the scale 94 is tared, the condition of the battery 92, the transmission by the antenna 98, the electrical connection to the port 90 or any other state or condition of the device.

Similarly, the display 28 may provide any of the same information as the indicators 26. The embodiment of the display 28 and indicators 26 in FIG. 1 are merely exemplary. Any format of visual indicators 26 or display 28 may be used within the inventive concept herein.

Controls 30 allow the user to interact with the features of the device. These controls 30 may be embodied as buttons or dials as shown in FIG. 1. Alternatively, the controls 30 are representative of any means to control the device whether physically connected to the base assembly 12 or remotely or wirelessly by a network connected device.

The controls 30 may control the tare feature of the scale 94, the general power settings of the device, may cycle through information on the display 28 or indicators 26 or provide other user interface as to the features of the device. In at least one embodiment, the display 28 shows what feature the indicators 26 are revealing.

The container assembly 14 contains a liquid to be consumed by the user. Optional graduations 24 are an analog indicator of the volume of liquid contained inside the container assembly 14. The graduations 24 may be etched or imprinted onto the side wall of the container assembly 14.

A handle 20 may be connected to the container assembly 14 to allow a user to easily grasp the hydration container for transport or during consumption of the liquid. An optional tether 22 may be provided to attach to another object such as a hook or a backpack.

The container assembly 14 may optionally include a waist 32 that provides an aesthetic detail as well as an additional visual indicator as to the volume of the contents of the container assembly 14. The waist 32 also, if present, provides an additional gripping surface for the user to hold.

To initially set up the device, while the container assembly 14 is empty, the user resets the scale 94 to zero with the tare feature. A predetermined liquid, such as water or any liquid, is introduced into the container assembly 14 through the neck 33. The scale 94 then is able to determine the initial weight of the liquid in the container assembly 14 when the full container assembly 14 is set on a level surface. This initial weight of the liquid is stored in the processor 96 as the starting point or full condition of the container assembly 14.

As the user consumes the liquid and returns the hydration container to a level surface the scale 94 will recalculate the weight of the liquid in the container assembly 14 and the processor 96 is able to calculate the difference indicating the weight and, by extrapolation, the volume of liquid consumed.

The processor 96 may then transmit a user readable information to the display 28 and/or the indicators 26. This information may also be transmitted to a mobile device or other network connected receiver via the antenna at 98. For example, the mobile device may be characterized as a smart watch, a phone, a computer or other device adapted to receive and use the information provided by the hydration container.

The hydration container may use alternate means other than they scale 94 to ascertain the volume of liquid contained in the container assembly 14 at any point in time. For example, depth sensing devices such as acoustic or laser measuring devices may be able to calculate the volume of liquid in the container assembly 14 at any point. In a more manual version, the user may input the initial volume of liquid from the graduations 24 and amend the volume read off the graduations 24 as the liquid is consumed.

The processor 96 may include a time sensing device, such as a clock. By computing the volume of liquid used in conjunction with the time that liquid was consumed the rate of liquid consumption can be readily calculated. The device can be pre-programmed with a rate of liquid consumption desired. For example, a user may desire to consume two liters of water during a workout of an hour. The clock may then be used in conjunction with the scale 94 or other volume measuring device to encourage the user to consume a half liter every fifteen minutes by communicating to the user with the indicators 26 or display 28. An audio alert may also be provided to indicate to the user to pay attention to the indicators 26 or display 28, or to simply remind the user to take a sip of liquid.

An important optional feature of the invention provides a capsule assembly 16 or diffuser assembly 72 to introduce an additional ingredient into the liquid contained in the container assembly 14. These additional ingredients can be another liquid, a powder, a gel, a solid object or an organic item.

In the case of liquids, an additive such as a flavoring liquid, vitamins, minerals or other liquid-borne ingredient can be contained in the capsule assembly 16 and selectively released into the container assembly 14 to then be mixed with the liquid contained therein.

Similarly, powders gels or other solid objects may mix with the liquid in the container assembly 14 when the user opens the capsule assembly 16 to be in fluid communication with the liquid contained therein. In one specific example, fruit or herbs may be put into the capsule assembly 16 or diffuser assembly 72 that adds their character to the liquid in the container assembly 14 when mixed.

Figure 2:
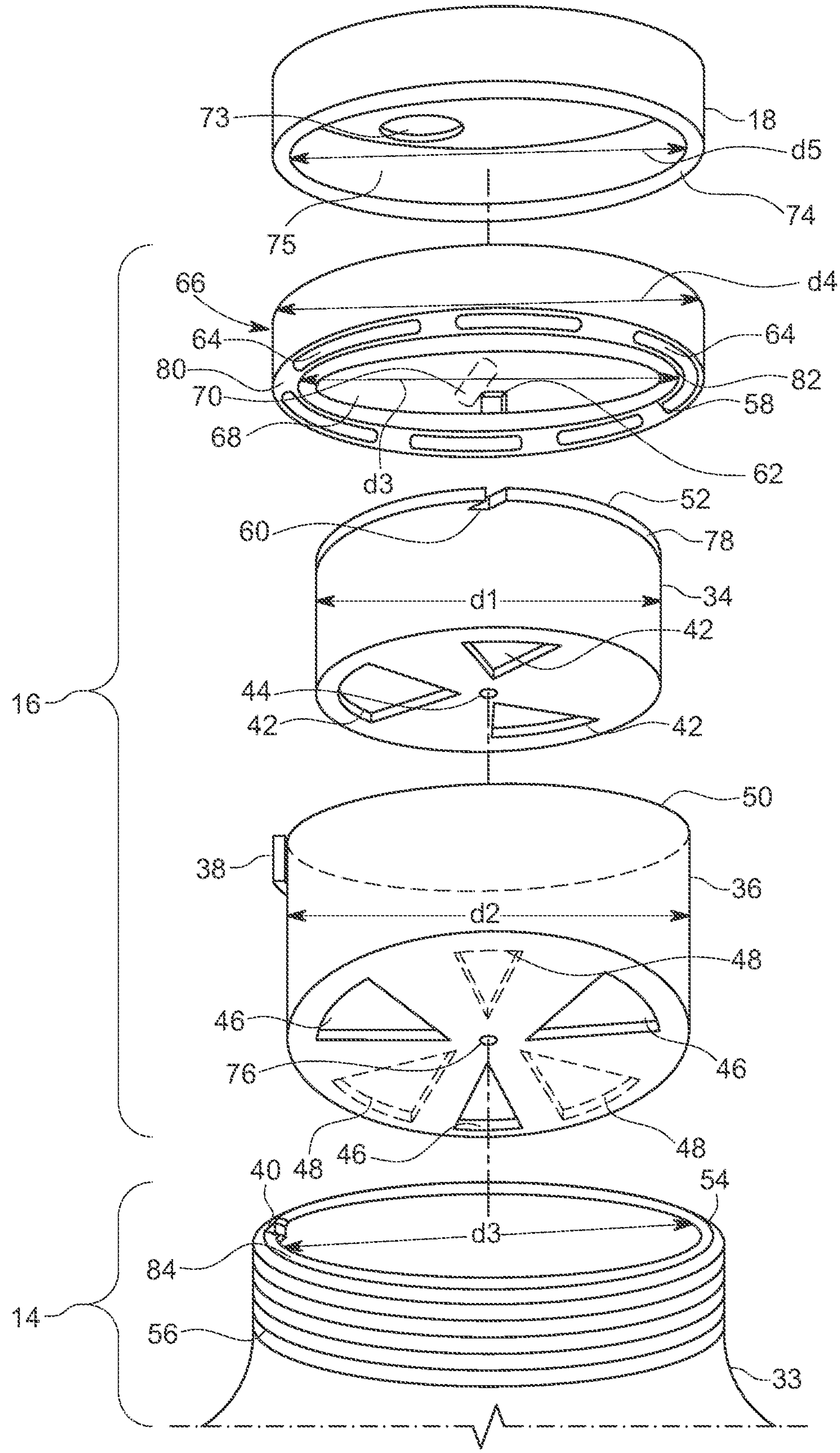
FIG. 2 shows a partial perspective exploded view of a capsule assembly and container assembly.

FIG. 2 shows an exploded perspective view of a version of a capsule assembly 16 that is selectively opened to introduce the contents of the inner cup 34 to the liquid contained in the container assembly 14. An important feature of the design shown in this figure allows the user to bypass the contents of the inner cup 34 when drinking liquid directly from the container 14. Essentially, the liquid flows around the outside edge of the inner cup 34.

Any of the adjuvants similar to those listed above may be placed into the inner cup 34. Through the bottom surface of the inner cup 34 is at least one aperture 42. The inner cup 34 is placed inside the outer cup 36 during normal use. The 0.44 of the inner cup 34 mates into the dimples 76 on the interior lower surface of the outer cup 36. This 0.44 and dimples 76 combination ensure that the inner cup 34 and outer cup 36 remain concentric.

In a closed state, the apertures 42 of the inner cup 34 are rotated inside the outer cup 36 so that the plugs 48 seal off the apertures 42 of the inner cup 34 maintaining the contents of the inner cup 34 secure inside the inner cup 34. When the inner cup 34 is rotated by the user, the apertures 42 may then align over the apertures 46 in the outer cup 36 thereby allowing fluid communication between the contents of the inner cup 34 and the liquid contained in the container assembly 14 below.

Dimension d1 is the exterior diameter of the inner cup 34. Dimension d2 is the interior diameter of the outer cup 36. Dimension d1 is smaller than dimension d2 of the outer cup 36 so that the inner cup 34 fits inside the outer cup 36. The differences in dimension d1 and d2 permit rotation of the inner cup 34 inside the outer cup 36 while maintaining concentricity between the inner cup 34 and outer cup 36. The difference between dimensions d1 and d2 allow liquid contained in the container assembly 14 to pass around the exterior of the inner cup 34 when the apertures 42 are plugged by the plugs 48 on the interior of the outer cup 36.

Essentially, in this pass-through configuration, liquid in the container assembly 14 can pass through the aperture's 46 in the bottom of the outer cup 36 and flow around the exterior of the inner cup 34, then pass through the aperture 64 in the lid assembly 66 and into the interior 75 and is ultimately dispensed through the aperture 73 in the cap 18. In pass-through mode. The apertures 42 in the inner cup 34 are aligned and plugged by the plugs 48 on the interior of the outer cup 36.

Free rotation of the inner cup 34 inside the outer cup 36 is maintained using, at least in part, the point 44 seated into the dimple 36 on the interior of the outer cup 36 while also maintaining concentricity between these two components.

The outer cup 36 has a tab 38 on an exterior edge of the rim 50. The tab 38 fits into the notch 40 to prevent rotation of the outer cup 36 in the neck 33 of the container assembly 14. The inner cup 34 also has a notch 60 on the upper at rim 52. This notch 60 fits over the tab 62 in the lid assembly 66 to prevent rotation of the lid assembly 66 relative to the enter cup 34 when the lid assembly 66 is attached to the inner cup 34.

The top of the intercom 34 is open to accept any of the adjuvants to be introduced into the liquid of the container assembly 14. The lid assembly 66 acts as a cover to seal in the contents of the intercom 34. The rim 82 of the lid assembly 66 mechanically snaps over the rim 52 of the intercom 34. A gasket 58 is provided to ensure a watertight seal between the lid assembly is 66 and the inner cup 34.

Diameter d3 is approximately equal to diameter d1. Diameter d4 is the exterior diameter of the lid assembly 66. One or more apertures 64 are provided in the margin between diameter d3 and diameter d4. These apertures 64 allow liquid in the container assembly 14 to flow from the container assembly through the apertures 46. and, when the plugs 48 are engaged into the apertures 42, no liquid can enter the inner cup 34. Instead, the liquid flows inside the outer cup 36 and outside the inner cup 34. The liquid then can continue to flow up through the aperture 64 into the interior 75 of the cap 18 and be dispensed through the aperture 73. In this fashion the liquid from the container assembly 14 completely bypasses the inner cup 34 and can be dispensed through the aperture 73 without mixing with the contents of the inner cup 34.

A lever 70 is provided on a top side of the lid assembly 66. The lever 70 provides a gripping surface that the user can grasp and rotate the lid assembly 66 and the joined inner cup 34. When the rim 52 of the inner cup 34 is snapped into the rim 82 of the lid assembly 66 the tab 62 is engaged in the notch 60 thereby preventing any relative rotation between the lid assembly 66 in the inner cup 34. Therefore, when the lever 70 on the lid assembly 66 is rotated the inner cup 34 rotates in lockstep.

As the connected lid assembly 66 and enter cup 34 are rotated, the outer cup 36 is fixed relative to the neck 33 of the container assembly. At the same time the plugs 48 and apertures 46 are fixed relative to the container assembly with the tab 38 of the outer cup 36 engaged into the notch 40 on the rim 54 on the lip 84 of the neck 33 on the container assembly 14. By maintaining the outer cup 36 fixed relative to the container assembly 14 and the lid assembly 66 fixed relative to the inner cup 34, the apertures 34 can selectively be lined up with the apertures 46 and the outer cup 36 or the apertures 42 and the enter cup 34 may be aligned with the plugs 48, merely by rotating the lever 70 on the lid assembly 66.

When the lid 66 is snapped onto the upper rim 52 of the inner cup 34 and the inner cup 34 is nested inside the outer cup 36, this assembly is inserted into the neck 33 of the container assembly 14. The cap 18 may then be snapped onto the rim 54 of the neck 33 engaging into lip 84. The upper side of the cap 18 also includes a frictionally fit or threaded spout covered 29 to seal the aperture 73.

FIG. 2 includes an alternate means to connect the cap 18 to the neck 33 of the container assembly 14 by providing threads 56. Threads 56 would mate with corresponding threads on the lower surface of the cap 18.

In an embodiment of the present design dimension d3 is sufficient to allow a user to easily remove the outer cup 36, inner cup 34, lid assembly 66 and cap 18 and insert their hand or cleaning implement to help sanitize the interior surfaces of the container assembly 14.

FIG. 3 shows several alternate embodiments or features of the present design. As an alternative to the inner cup 34 and outer cup 36, a diffuser assembly 72 may be inserted into the rim 54 of the neck 33. The diffuser assembly 72 may be filled with, for example, herbs or fruit. When the diffuser assembly 72 is placed into the container assembly 14 the liquid in the container assembly 14 may freely flow through the apertures 86 and diffuse the essence of the contents of the diffuser assembly 72 into the liquid.

An example of the electrical components contained within the base of the container assembly 14 is shown in FIG. 3. A battery 92 is provided to energize the electrical components. A port 90 is provided to supply electrical power to recharge the battery and/or provide a wired communications link to an external device. A processor 96 is configured to provide onboard computing power and to interface with the indicators 26, display 28 and controls 30. An antenna 98 may be connected to their processor 96 to provide incoming information of instructions for the processor 96 or outgoing data derived from the components of the device.

The lower surface of the container assembly 14 may be concave with a central bottom 31. The scale 94 is positioned adjacent to the bottom 31 and is adapted to measure the weight of the liquid contained in the container assembly. Generally, the device must be placed on a level surface to allow the liquid contained in the container assembly 14 to stabilize and settle in the bottom 31 over the scale 94.

The scale 94, generally may be any technology to derive the volume of liquid contained within the container assembly 14. In the example shown in FIG. 3, a scale 94 is utilized to measure the weight of the liquid to extrapolate the volume of liquid. Other technology similar to a scale 94 may be utilized that measure the quantity of the liquid.

For example, a device to measure the depth of the liquid will also accurately determine the quantity of liquid in the container assembly 14. A laser or sonic depth finder or transducer also readily is able to determine the quantity of liquid.

In yet another example there may be a small aperture with diaphragm at the bottom 31. In this version of the device the scale 94 may be characterized as a strain gauge load cell. The weight of the liquid on the diaphragm or platform presses down and because of the load cell to bend. As the load cell bends and electrical signal is generated that is interpreted as a weight measurement.

In one version of the invention an optional magnetic surface is provided affixed to the container assembly 14. This magnet preferably has sufficient magnetic strength to hold items such as keys, a phone, pocket knives or other similarly sized and magnetic items. The magnetic feature is useful to help the user maintain items without having to keep them in a pocket.

An alternate embodiment of a capsule assembly 16 may include a filtration pathway that filters the liquid as it is being placed into the container assembly 14. The filter may be a coal water filter or activated carbon to remove impurities from the liquid before it is consumed by the user. Other filter technology may be equally suitable such as reverse osmosis, fiber, nanopore or other commercially available liquid filtering devices may be employed. Similarly, the filter may filter the liquid as it is being dispensed from the container. In this way only the liquid actually being consumed is passed through the filter.

An optional feature of the container assembly 14 includes a detachable connection to the base assembly 12. The intersecting surface between the container assembly 14 and the base assembly 12 results in a liquid-proof seal when these two components are affixed to each other. This is the normal mode of operation when the container assembly 14 has liquid inside. The base assembly 12 may be selectively disconnected from the container assembly 14 resulting in a wide open bottom of the container assembly 14. This allows easy cleaning of the interior surfaces of the container assembly 14 with unobstructed access to the interior. This also allows the installation of a different base assembly 12 to improve functionality with new or alternate features as well as to simply repair a malfunctioning base assembly 12.

The base assembly 12 may have a snap on perimeter that friction fits onto the bottom rim of the container assembly 14 to connect the two together. Similarly, a threaded connection could be used. Other types of connecting means may be used that allow for a water-proof seal and yet are capable of separation for cleaning or replacement.

An important version of the present invention, including several optional details, can be fairly described as a hydration container (or sports bottle) comprised generally of a container assembly and a capsule assembly contained therein. The container assembly has an open interior volume that contains a hydrating liquid such as water, milk or other hydrating liquid to be consumed by the user. Inside the base of the container assembly is an electronic device to measure the volume of the hydrating liquid contained inside the container at any given point in time. The electronic means, generally a scale or other liquid measuring device, determines the volume of liquid inside the container assembly at one point in time and compares it to the volume at a later point in time to determine the rate of consumption of the liquid over time. The device produces a notification if the rate is less than, equal to or greater than the predetermined rate. The expected or desired rate of consumption is entered into the electronic assembly prior to the use of the device. For example, a user may want to consume at least 100 mL of liquid every fifteen minutes during a workout. The device can measure the volume of liquid to determine if at least 100 mL of liquid has been consumed during that time. If not, an indicator may alert the user that they are falling behind and may wish to consume more liquid. Similarly, if a user desires to not over hydrate, the device may signal they are consuming water at a rate too fast for the hydration rate profile. Essentially, the electronic circuitry means, including the scale, processor and battery, determine the volume of liquid inside the container at the first point in time and compares the volume inside the container at a second, later point in time and may produce a notification if the rate of consumption is less or more than the expected or desired predetermined rate. The capsule assembly is generally comprised of a cup and a. lid assembly The cup contains in an adjuvant comprising a powder, gel, solid or liquid to be added to the liquid inside the container so that it that can be selectively introduced into the hydrating liquid prior to consumption by the user. The capsule assembly may further comprise an outer cup and a lid. The outer cup fits into the neck of the container assembly. The outer cup is fixed relative to the neck to prevent the outer cup from rotating axially within the next. For example, this may be achieved by a tab and mating notch. The lid assembly seals an upper opening of the cup, essentially closing the top of the cup. However, the lid assembly has a greater diameter than the cup. On the periphery of the lid assembly, outside the boundary of the upper opening of the cup there are apertures to allow flow through. The lid assembly is fixed relative to the cup so that the lid assembly rotates with the cup. This may be achieved with a notch and mating tab. The upper side of the lid assembly may include a lever or handle to allow the user to grasp the lid assembly better to enforce the rotation of the inner cup within the outer cup. The bottom surface of the cup has at least one aperture. The bottom surface of the outer cup has another aperture and a plug. Both the aperture and the plug in the bottom surface of the outer cup are dimensioned to be complementary in size with the aperture in the bottom surface of the cup. The cup is fit into and rotates coaxially inside the outer cup between a sealed mode and an open mode. In the sealed mode the aperture in the bottom of the inner cup is juxtaposed over the plug, effectively sealing the adjuvant inside the inner cup. The inner cup may be optionally rotated relative to the outer cup to move the aperture in the bottom of the inner cup to align with the aperture in the outer cup, thereby providing fluid communication between the cup containing the adjuvant and the balance of the liquid in the container assembly. It should also be appreciated that the diameter of the outer cup is greater than the diameter of the inner cup so that there is a margin between the inner cup and outer cup allowing the liquid in the container assembly to essentially enter the aperture in the outer cup, pass and flow around the outside of inner cup, without mixing with the contents of the inner cup, and flow through the apertures in the lid assembly where the liquid can be dispensed through the cap. By this means, the liquid in the container assembly completely bypasses the sealed contents of the inner assembly. This may be done before or after the contents of the inner assembly are exposed to the liquid in the container assembly and mixed together.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A hydration container comprised of a container assembly and a capsule assembly;
- the container assembly has an open interior volume that contains a hydrating liquid;
- within a base of the container assembly is an electronic means to determine the volume of hydrating liquid inside the container assembly at a first point in time;
- the electronic means determines the volume of liquid inside the container assembly at the first point in time and compares the volume of liquid inside the container at a second point in time and produces a notification if a rate of consumption of the liquid is less than a predetermined rate;
- the capsule assembly is comprised of a cup and a cap;
- the cup contains an adjuvant that is selectively introduced into the hydrating liquid prior to consumption by a user;
- the capsule assembly further comprises an outer cup and a lid assembly;
- the outer cup fits into a neck of the container assembly;
- the outer cup is fixed to the neck preventing the outer cup from rotating axially within the neck;
- the lid assembly seals an upper opening of the cup;
- the lid assembly is fixed to the cup so that the lid assembly rotates with the cup;
- a bottom surface of the cup has a first aperture;
- a bottom surface of the outer cup has a second aperture and a plug;
- the cup is fit into and rotates coaxially inside the outer cup between a sealed mode and an open mode;
- in the sealed mode the first aperture is sealed by the plug effectively sealing the adjuvant in the cup and in the open mode the first aperture is aligned with the second aperture providing fluid communication between the cup and the container assembly;
- an inner diameter of the outer cup is greater than the outer diameter of the cup so that the liquid in the container assembly flows through the second aperture then between the outer cup and cup then through an aperture on the lid assembly then through an aperture in the cap where the liquid is dispensed.

2. The hydration container of claim 1 further characterized in that the cup has a plurality of apertures in a sidewall of the cup.

3. The hydration container of claim 1 further characterized in that the notification is a wireless broadcast.

4. The hydration container of claim 1 further characterized in that a magnet is affixed to an exterior surface of the container assembly with sufficient magnetic strength to support a preselected metallic object.

5. The hydration container of claim 1 further characterized in that the cup contains an operative filter adapted to filter liquid passing through the cup.

6. The hydration container of claim 1 further characterized in that the base of the container assembly is separable from a bottom rim of the container assembly providing access to the interior of the container assembly.

7. A hydration container comprised of a container assembly and a capsule assembly;
- the container assembly has an open interior volume that contains a hydrating liquid;
- within a base of the container assembly is an electronic means to determine the volume of hydrating liquid inside the container assembly at a first point in time;
- the electronic means determines the volume of liquid inside the container assembly at the first point in time and compares the volume of liquid inside the container at a second point in time and produces a notification if a rate of consumption of the liquid is less than a predetermined rate;
- the capsule assembly is comprised of a cup and a cap;
- the cup contains an adjuvant that is selectively introduced into the hydrating liquid prior to consumption by a user;
- the capsule assembly further comprises an outer cup and a lid assembly;
- the outer cup fits into a neck of the container assembly;
- the outer cup is fixed to the neck preventing the outer cup from rotating axially within the neck;
- the lid assembly seals an upper opening of the cup;
- the lid assembly is fixed to the cup so that the lid assembly rotates with the cup;
- a bottom surface of the cup has a first aperture;
- a bottom surface of the outer cup has a second aperture and a plug;
- the cup is fit into and rotates coaxially inside the outer cup between a sealed mode and an open mode;
- in the sealed mode the first aperture is sealed by the plug effectively sealing the adjuvant in the cup and in the open mode the first aperture is aligned with the second aperture providing fluid communication between the cup and the container assembly;
- an inner diameter of the outer cup is greater than the outer diameter of the cup so that the liquid in the container assembly flows through the second aperture then between the outer cup and cup then through an aperture on the lid assembly then through an aperture in the cap where the liquid is dispensed;

the base of the container assembly is separable from a bottom rim of the container assembly providing access to the interior of the container assembly.

* * * * *